United States Patent [19]

Hight, Jr.

[11] 4,229,153

[45] Oct. 21, 1980

[54] APPARATUS FOR USE IN SLIP FORMING STRUCTURAL CONCRETE MEMBERS

[76] Inventor: Henry D. Hight, Jr., 6400 Drury La., Fort Worth, Tex. 76116

[21] Appl. No.: 18,787

[22] Filed: Mar. 8, 1979

[51] Int. Cl.[3] .............................................. B29D 7/12

[52] U.S. Cl. ...................................... 425/64; 425/162; 425/224; 425/432; 425/456

[58] Field of Search ..................... 425/162, 64, 63, 65, 425/432, 456, 115, 224; 264/71, 72, 33, 34

[56] References Cited

U.S. PATENT DOCUMENTS

| | | | |
|---|---|---|---|
| 2,225,015 | 12/1940 | Lebelle | 425/64 |
| 3,208,362 | 9/1965 | Sigmund | 425/64 |
| 3,217,375 | 11/1965 | Kinnard | 425/64 |
| 3,740,176 | 6/1973 | Nilsson | 425/64 |
| 3,989,230 | 11/1976 | Martens | 425/64 |

*Primary Examiner*—Donald J. Arnold
*Attorney, Agent, or Firm*—Michael L. Parks

[57] ABSTRACT

There is disclosed apparatus for use in slip forming concrete structural members wherein concrete is fed through a hopper to the front end of an inverted "U" shaped forming chamber, which is caused to move over and along the top surface of a pallet by means of support rollers which engage rails along the sides of the pallet.

24 Claims, 21 Drawing Figures

FIG. 14
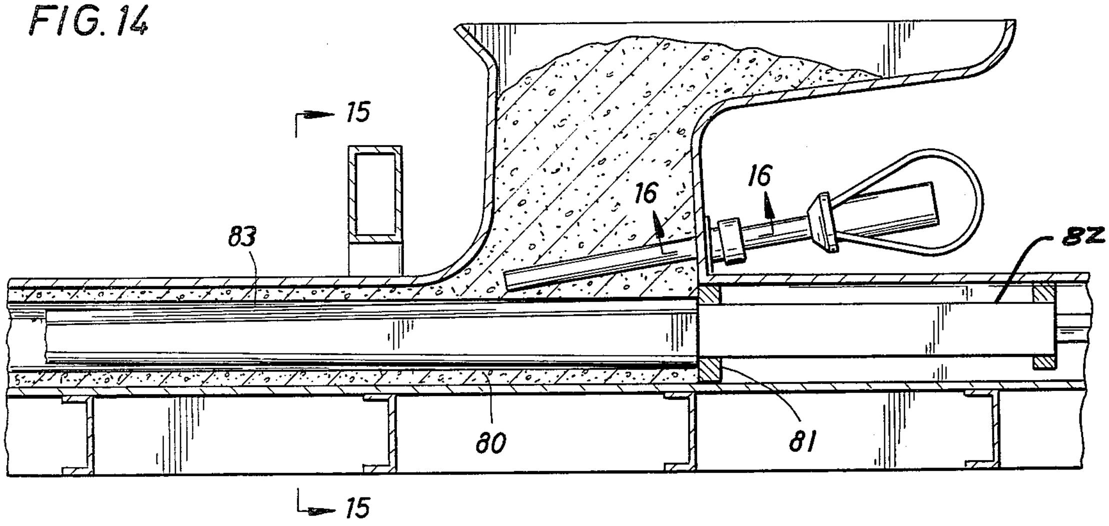
FIG. 15
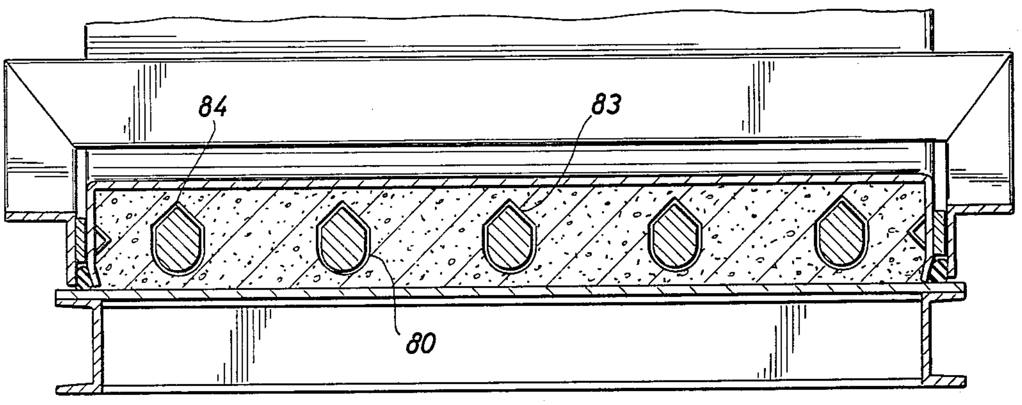
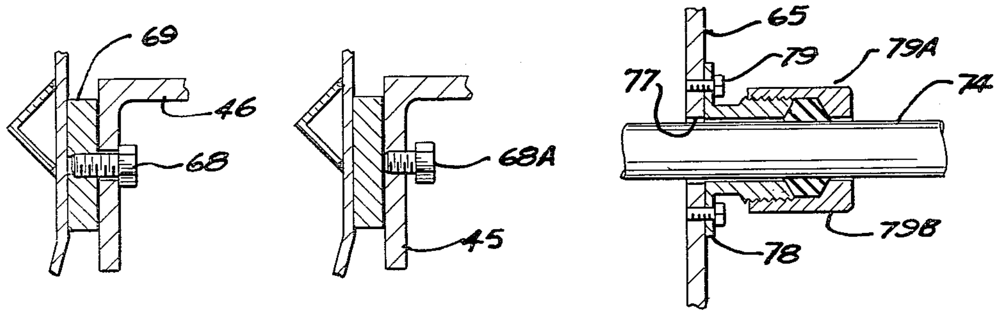
FIG. 8A
FIG. 8B
FIG. 16

FIG. 11
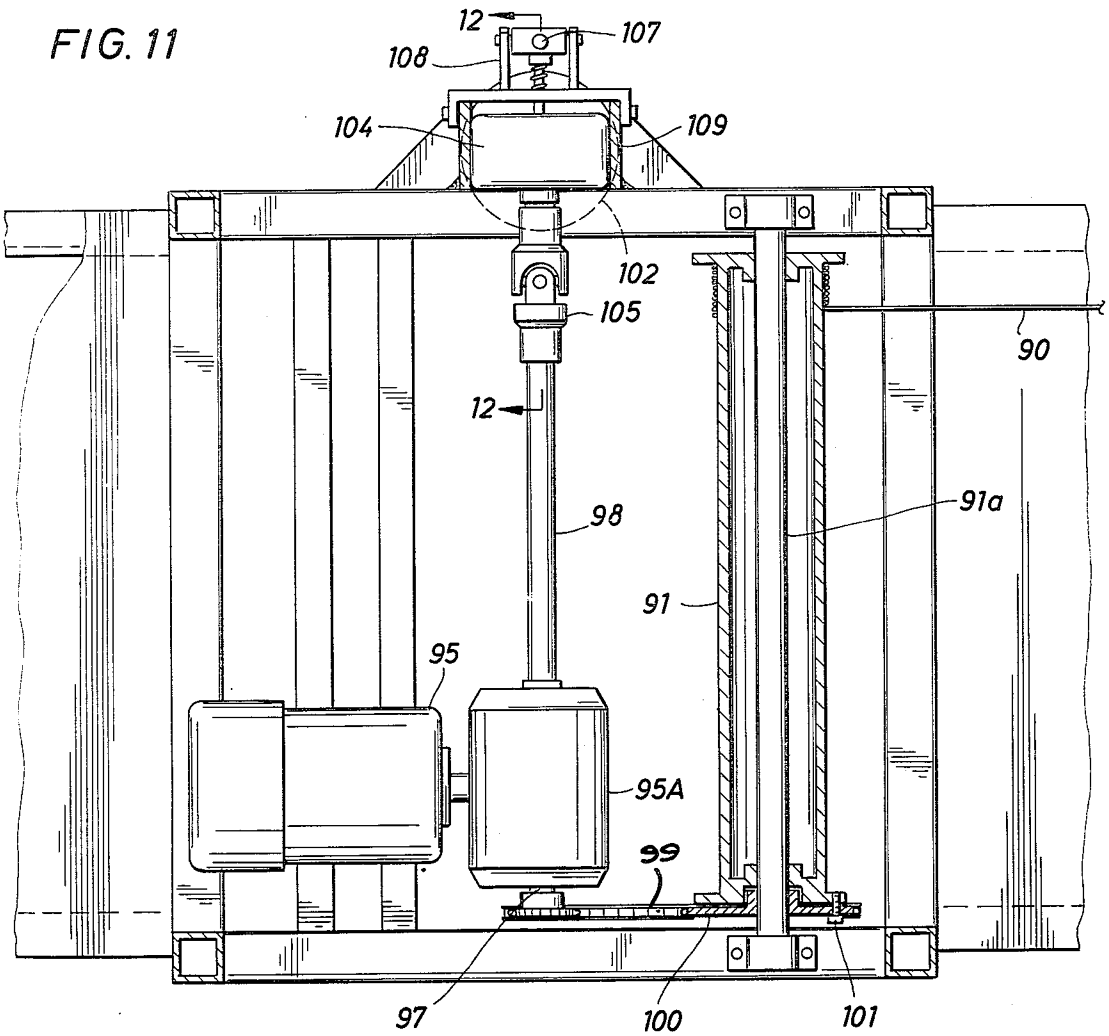
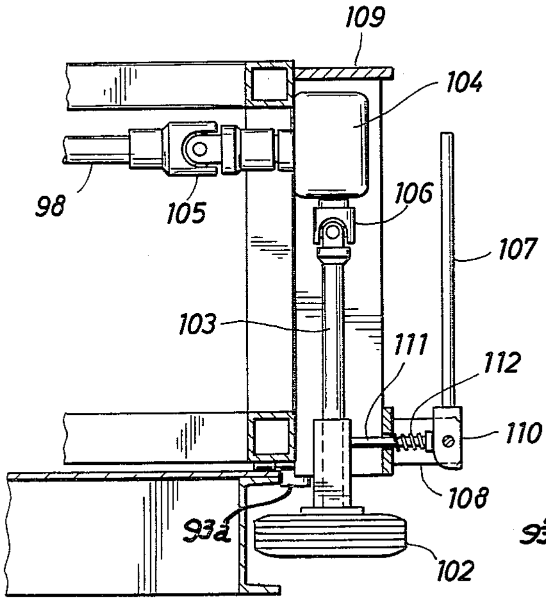
FIG. 12
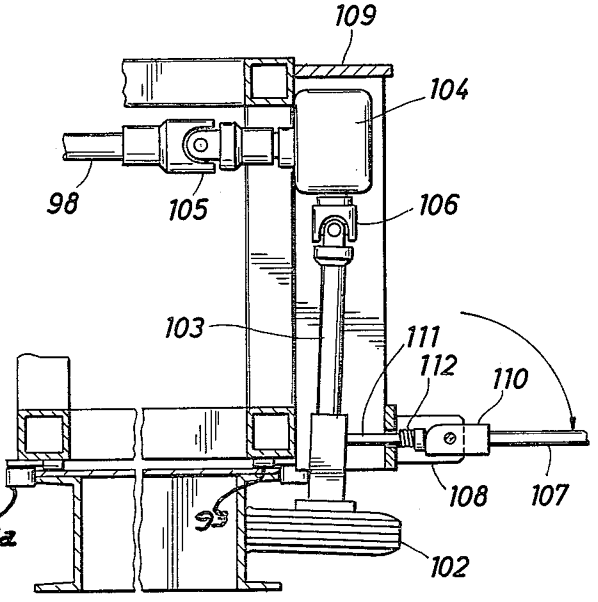
FIG. 13

APPARATUS FOR USE IN SLIP FORMING STRUCTURAL CONCRETE MEMBERS

This invention relates to apparatus for use in slip forming structural concrete members, such as building wall panels or the like. More particularly, it relates to improvements in apparatus of this type wherein concrete is fed through a hopper of a forming body to the front end of an inverted "U" shaped forming chamber which is caused to move over and along the top surface of a pallet by means of support rollers which engage with rails along the sides of the pallet.

In typical apparatus of this type, such as that manufactured by the Concrete Engineering Device of Martin Industries, of Fort Worth, Texas, a low slump concrete is fluidized, as it flows downwardly through the hopper, by means of vibrators at the front end of the forming chamber. A cable having its free end attached to one end of the pallet is wound on a reel supported on a frame on which the forming body is carried to cause the frame to move along the pallet. The lower edges of the side walls of the framing chamber are held close to the top surface of the pallet so as to minimize the loss of concrete beneath the edge. The cross section of the chamber may be modified by adjustment of the walls of the forming chamber with respect to one another and to the pallet.

In the particular apparatus referred to above, an auger lifts concrete from a charging hopper to the upper end of the hopper leading to the front end of the forming chamber. This not only adds to the weight and size of the apparatus, but also requires large, hydraulically operated equipment, which adds to the original cost, maintenance, size and weight of the apparatus. Still further, since the reel as well as the operating components are carried by the same frame on which the forming body is supported, auxiliary equipment, such as saws and brushes which may be moved over the pallets when the formed member has set up, require either another source of motive force or the wasteful consumption of energy involved in moving the entire frame back over the pallet.

The weight of the apparatus which is transmitted to the pallet through the supporting rollers on the frame may bend the rails and/or cause them to wear to such an extent that the lower edges of the side walls of the forming chamber gouge into the top surface of the pallet. Similar distortions in the apparatus may put such severe strains on the adjustable parts of the forming chamber as to cause them to bend and/or separate, and thereby leave openings through which concrete may flow during the forming operation. This in turn not only affects the cross section of the member to be formed, but also permits concrete to foul the adjustable parts of the forming chamber, thus necessitating that they be washed down, or even repaired or replaced, with great frequency.

Although the adjustability of the parts of the forming chamber of the above-described apparatus obviates the need for individual chambers for each different shape to be formed, it is often quite time-consuming, especially when the parts require washing or repair between forming operations. Also, the connections between the separate adjustable parts making up the forming chamber undergo considerable strain, as the concrete being formed passes through the forming chamber, both in an upward direction against the top wall as well as in lateral directions against the side walls. Despite the use of vibrators, difficulties have been encountered in causing the concrete to flow evenly from the hopper into the front end of the forming chamber-i.e., the concrete has a tendency to bridge as it leaves the lower end of the hopper. Also, in the above described apparatus, the vibrators are not easily and quickly removable to permit individual ones of them to be replaced or repaired.

It is often the practice, to use apparatus of this type in a system having a pair of pallets arranged in a spaced-apart, side-by-side relation so as to facilitate forming a member on one as a member previously formed on the other is permitted to set up. In apparatus as above-described, the forming chamber, after being pulled from one end of a pallet to the other by reeling in one cable, is pulled along the length of the second pallet by reeling in a second cable. This requires, in preparation for forming the second member and after transfer from one pallet to the other, that the free end of the second cable be unwound from its reel and extended for attachment to the far end of the second pallet. Also considerable care must bc taken to handle a cord, which normally supplies power from an energy source intermediate the pallets to an electrical motor on the frame, in such a manner as to prevent it from being drug across the just formed member.

It is also the practice, in using apparatus of this type, to lay a tarpaulin over the just formed concrete member to protect it from the weather as it sets up. The tarpaulin is anchored to one end of the pallet so as to be automatically unwound from a reel and laid over the formed member as the reel is pulled behind the forming chamber. However, if the tarpaulin is laid directly onto the concrete member, it may stick thereto or otherwise damage it as it sets up. Thus, caution should be taken to raise it above the member on the pallet immediately upon its emergence from the forming chamber.

It has also been proposed to support dies in the forming chamber in order to form hollow core members. However, if the concrete cores do not separate cleanly from the die, the interior of the core may not be smooth. Also, difficulty has been encountered in causing the concrete to uniformly fill in between the cores.

An object of this invention is to provide apparatus of this type which is of less complicated and lighter construction than those above-described, thereby not only lessening the cost of same, but also reducing the likelihood of bending and/or wear on the rails which might permit the side walls of the forming chamber to gouge into top surfaces of the pilot or otherwise distort the adjustable parts of the forming chamber to such an extent as to permit concrete to escape therefrom.

Another object is to provide such apparatus which eliminates the need for adjusting parts of the forming chamber which are subject to such strain and distortion of the apparatus, and thus further minimizes the possibility of concrete escaping from the forming chamber.

Still another object is to provide apparatus of this type wherein the hopper is of such construction as to reduce the tendency of concrete to bridge as it is fed through a chute of the hopper into the front end of the forming chamber.

Yet a further object is to provide such apparatus in which vibrators for fluidizing the concrete as it enters the forming chamber are so mounted on the forming body as to be easily and quickly removable therefrom, and, more particularly, individually removed therefrom so as to permit one to be replaced or repaired without disturbing operation of the others.

Yet another object is to provide such apparatus which enables the tarpaulin to be held up above the formed concrete member, as the reel on which it is wound is towed with the forming body, without interrupting the continuous forming operation.

A still further object is to provide such apparatus in which forming dies supported in the forming chamber in order to form hollow cores in the concrete member are so constructed and arranged as to promote clean separation from the interior surfaces of the cores as well as to facilitate free flow of concrete into spaces between the dies.

Yet a further object is to provide such apparatus which enables a layer of facing material to be applied to one side of the concrete member during the forming thereof in the forming chamber.

These and other objects are accomplished, in accordance with the illustrated embodiments of the present invention, by apparatus of the type described wherein the forming body is rigidly connected to a frame on which the supporting wheels are carried, and the lower edges of the side walls of the forming chamber are moved into positions close to the top surface of the pallet by adjusting the elevation of the rollers with respect to the frame. More particularly, the frame includes longitudinally extending side members having depending side plates whose lower edges extend downwardly to positions close to the top surface of the pallet, and first rollers are mounted on the side members outboard of the side plates for movement over the rails to support the frame. More particularly, second rollers are also mounted on the side members outboard of the side plates for engaging the lower sides of the rails, and both the first and second rollers are adjustable vertically with respect to the frame, so that when the first rollers are adjusted to a desired elevation with respect to the frame, the second rollers may be adjusted to tightly engage the lower sides of the rails, and thus hold the first rollers tightly against the top sides of the rails.

The side walls of the forming chamber are connected to the inner sides of the side plates of the frame, so that both the side walls of the forming chamber and the side plates of the frame are disposed inboard of the rollers. Consequently, in order for concrete to interfere with the rollers, it must pass beneath the lower edges of both the side wall and the side plate. More particularly, and in accordance with the preferred embodiment of the invention, the connecting means comprises a plate extending along and connected to the outer side of each side wall of the chamber, whereby the side wall is reinforced against lateral forces due to the concrete, and bolts connecting the side plates of the side members of the frame to the reinforcing plate. The lower edge of the reinforcing plate is spaced above the lower edges of the side wall of the chamber and the side plate of the side member to form a downwardly opening longitudinal recess, and a strip of deformable sealing material is wedged into the recess so as to protrude from its lower end to form a sliding seal with the top surface of the pallet.

The hopper of the forming body through which concrete may be fed to the front end of the forming chamber includes a vertical chute having side walls forming upward continuations of the side walls of the forming chamber and front and rear walls which extend laterally between the side walls. More particularly, and in accordance with another novel aspect of the present invention, the front and rear walls flare forwardly and rearwardly, respectively, from the upper end of the hopper, and the lower end of the rear wall of the chute curves downwardly and rearwardly to its intersection with the front edge of the upper wall of the forming chamber. This downwardly diverging opening through the chute is believed to minimize the possibility of concrete bridging, and the smooth transitional surface at the front end of the forming chamber is thought to promote flow of concrete into the front end of the forming chamber.

As compared with the previously described apparatus of this type, the motive means including the motor and reel having a cable wound thereabout, are supported on a carriage having a roller-supported frame separate from that on which the forming body with its forming chamber are mounted. In addition to more evenly distributing the weight of the apparatus, this enables the carriage on which the motive means is carried to be disconnected from the forming chamber carriage, whereby it may be used in causing auxiliary equipment, such as saws, brooms, or brushes to be moved along the pallet without having to pull the weight of the other carriage. In accordance with another novel aspect of the invention, the frame on which the reel is mounted also supports a wheel having a tire which may be moved into driving engagement with the rail. Thus, upon winding of the cable on the reel, to move the apparatus from one end of one pallet to the other, the reel may be disconnected from the motor to permit the appartus to be shifted onto an adjacent pallet, and then moved by the wheels along its length to form another concrete member without the necessity of unwinding cable from a second reel.

More particulary, in its preferred form, the apparatus enables the frame on which the forming chamber is mounted to be moved over both pallets, either by winding of the cable on the reel or by driving engagement of the tire with the side of a rail, with the use of only a single power source. For this purpose, a clutch is disposed between the power source and the reel, so that with the tire moved into tight engagement with the rail, the clutch may disconnect the reel from the motive source. On the other hand, when it is desired to move the forming chamber by winding up the reel, the clutch may be engaged and the tired moved out of tight engagement with the rail.

Thus, the invention is particularly useful in forming structural concrete members on spaced-apart side-by-side pallets having a pair of end sections each shiftable between positions in alignment with an intermediate portion of one or the other of the pallets. Toward this same end, a power cord leading from the power source on the frame has an intermediate portion thereof supported by an end of a rod which is shiftable laterally of the frame between positions in which its opposite ends extend beyond one side or the other of the frame. Thus, with the power source intermediate the pallets, the rod is shifted toward the side of the pallet on which the power source is located, which in turn depends on which pallet is being traversed, and an intermediate portion of the cord supported by the extended end of the rod to hold it above the formed member.

Since the forming body is fixedly mounted on the frame, it is especially desirable that the vibrators be easily and quickly released from the forming body, whereby one forming body may be replaced with another in order to form a structural member of different cross-sectional shape. Thus, each mounting means comprises a plate having a tubular extension on its rear end to closely receive the shaft of the vibrator, when the rod of the vibrator on the end of the shaft is properly disposed within the hopper, and means are provided for attaching the plate to the front side of the front wall of the hopper in surrounding relation to the hole therein. A ring of deformable sealing material is disposed in a recess in the tubular extension, and a nut is threaded over the tubular extension and fits closely about the vibrator shaft for deforming the seal ring into sealing engagement with the vibrator shaft as the nut is made upon the extension.

In accordance with another novel aspect of the present invention, beams are mounted on the frame for extension laterally across the forming chamber above its top wall, and rods are carried on the beams for vertical movement with respect thereto. In this manner, the lower ends of the rods may be forced against the top wall of the forming chamber so as to bend the top wall downwardly and thus counteract the force due to the concrete tending to bend the top wall upwardly as the concrete flows through the forming chamber.

In accordance with a still further novel aspect of the invention, each of a plurality of dies supported by the forming body forwardly of the lower end of the hopper and extending into the forming chamber has an upper end comprising intersecting flat walls which diverge downwardly, and the upper and lower ends and the sides of the dies converge from the front to the rear end thereof. A die having this shape has been found especially well suited to slip forming in accordance with the present invention that it facilitates the free flow of concrete downwardly over the upper ends of the dies and into the space between them and also facilitates separation of the trailing end of the die from the core formed thereby.

In accordance with yet another novel aspect of the invention, flexible, inverted "U"-shaped rods are provided with grooves in their lower, free ends for fitting over the edges of the rails in order to hold a tarpualin above the formed member as it emerges from the rear end of the forming chamber. Thus, the sides of the rods are high enough to permit the formed concrete member to pass beneath them when they are so mounted on the rails, and the frame on which the tarpaulin is wound is of an inverted "U" shape which is adapted to pass over the fitted rods. In use, the rods are installed on the rails between the rear end of the forming chamber and the frame on which the tarpaulin is carried.

In accordance with the preferred embodiment of the invention, the forming body also has a second hopper through which a facing material may be fed to the forming chamber intermediate its front and rear ends to apply such material to the top side of the concrete member to be formed, and the portion of the top wall of the chamber rearward of the second hopper is higher than that foward of the second hopper so as to allow for passage of the lower of the facing material on the top side of the concrete member. More particularly, a roller is provided for smoothing and compressing the facing material against the top side of the concrete member in order to form the layer thereon, and a paddle assembly is mounted for rotation about a transverse axis within the lower end of the hopper for regulating the flow of facing material onto the top surface of the concrete member.

In the drawings, wherein like reference characters are used throughout to designate like parts;

FIGS. 8A and 8B are partial cross-sectional views of the frame and forming chamber, as seen along broken lines 8-A and 8-B of FIG. 8;

FIG. 11 is a top plan view of the frame on which the cable reel, motor and driving wheel are supported, as seen along broken lines II—II of FIG. 4, but on a larger scale;

FIG. 12 is a cross-sectional view of part of the equipment of FIG. 11, as seen along broken lines 12—12 of FIG. 11;

FIG. 13 is a view similar to FIG. 12, but with the tire moved into tight, driving engagement with a side of the rail of the pallet;

FIG. 14 is a longitudinal sectional view identical to FIG. 6, except for the addition of core forming dies mounted on the forming body and extending into the forming chamber;

FIG. 15 is a cross-sectional view of the apparatus of FIG. 14, as seen along broken lines 14—14 of FIG. 15;

FIG. 16 is an enlarged longitudinal sectional view of the releasable connection of a vibrator to the front wall of the hopper;

Figure 1:
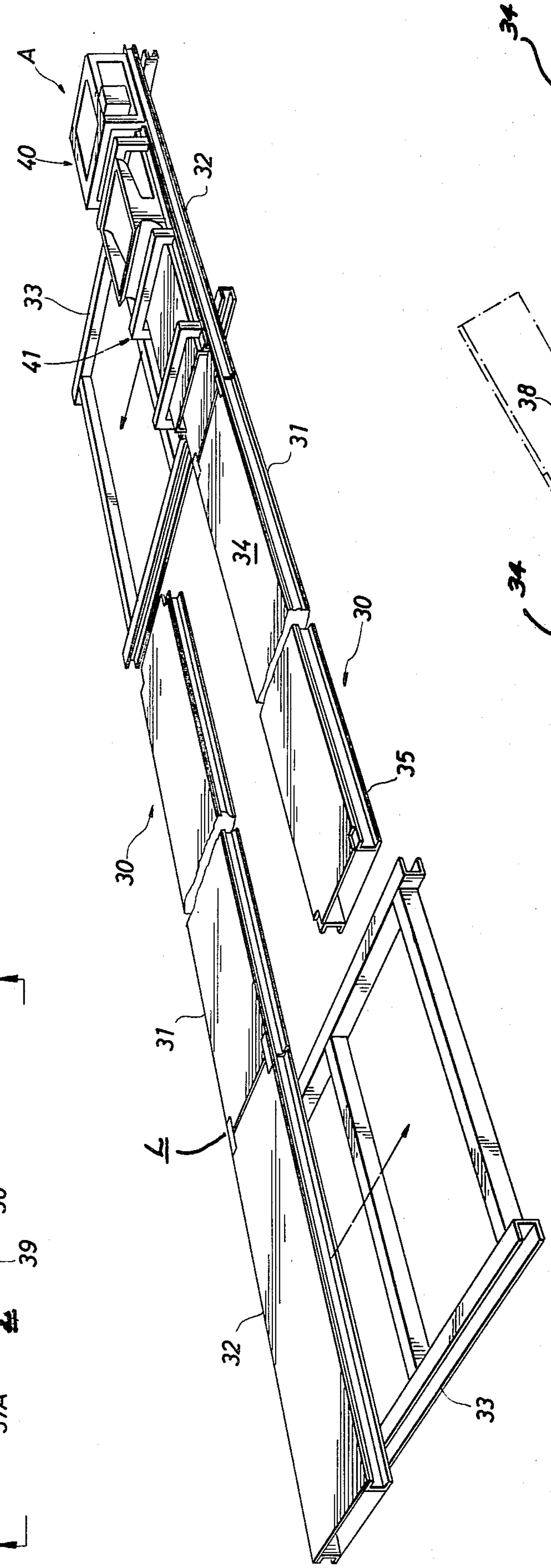
FIG. 1 is a perspective view of a system comprising a pair of laterally spaced-apart pallets whose intermediate sections are broken away for purposes of illustration, and having apparatus constructed in accordance with the present invention in position on the end selection aligned with the end of the intermediate section of one such pallet.
Figure 2:
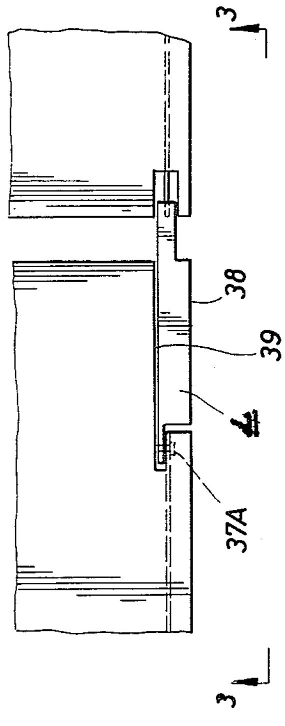
FIG. 2 is an enlarged top plan view of a latch between an end section and the end of an intermediate section of a pallet.

With reference now to the details of the above-described drawings, the system of FIG. 1 comprises a pair of pallets 30 each comprising along, intermediate section 31 parallel to and laterally spaced from the intermediate section of the other pallet, and a pair of short, end sections 32 laterally shiftable between alignment with the adjacent end of one intermediate section or the other. Each long section is reinforced by lateral braces 31A (FIG. 6) and is supported on a flat surface in any suitable manner, such as the concrete bed 30A shown in FIG. 4. Each end section 32 is mounted on a platform 33 which permits it to be shifted laterally between alignment with the intermediate section of one or the other pallet.

As also shown in FIG. 1, apparatus A is mounted on the end section aligned with the right end of the intermediate section of one pallet, and the other end section 32 is aligned with the left end of the intermediate section 31 of the other pallet. In use of the system, the end section 32 upon which apparatus A is mounted may be shifted in the direction of the arrow into alignment with the right end of the intermediate section 31 of the far pallet, and thus into position for moving to the other end of the far pallet in the process of slip forming a concrete member thereon. When such apparatus has been moved onto the end section 32 at the left end of the far pallet, it may be shifted with such end section to the adjacent end of the intermediate section 31 of the near pallet 30, as indicated by the arrow, and then moved lengthwise back to the position of FIG. 1 preparatary to moving from right to left in the slip forming of a concrete member on the near pallet.

As well known in the art, each pallet section comprises a flat steel plate 34 which forms its top surface and which is supported along opposite sides upon the upper legs of channels 35 which face outwardly. The outer edges of the plate and upper flanges of the channels provide upper rails 36, and the lower flange of the channels provide lower rails 37. Each end section may be releasably connected with its top surface and rails in alignment with those of an intermediate section of a pallet by any suitable means. Thus, for example, L may be hinged to the end section by pins 37A to permit them to be swung to and from position in which flanges 38 thereof form continuations of the upper rails of the adjacent ends of the end section and intermediate section. When in latching position, latches L prevent sidewise movement of the sections out of aligned position, but permit relative longitudinal movement between them to accommodate expansion and contraction. When swung out of latching position, as shown in broken lines in FIG. 3, the latches permit the ends sections to be shifted laterally into and out of latching position.

Apparatus A comprises a pair of carriages 40 and 41 each having a frame provided with rollers for moving over the rails of a pallet 30. The frame of carriage 40 carries the motive force for the apparatus including the cable reel, the driving wheel, and the power source for each which enables it to be moved forwardly from one end of a pallet to the other. The carriage 41 which is attached to carriage 40 for movement therewith has a forming body carried on its frame which has a forming chamber through which concrete passes and emerges from its rear end as a formed member.

The frame 42 of carriage 41 comprises longitudinally spaced-apart beams 43 which extend across the pallet and having depending legs at each end (see FIG. 7) generally above the rails on each side of the pallet. The frame also includes side members 44 extending along each side of the frame to connect the lower ends of the legs of the beams 43. As shown, each side member comprises an angle having an inner side plate 45 extending downwardly from the inner side of the leg of each beam, and a top plate 46 extending outwardly from the upper end of the side plate 45 across the lower edge of each plate.

Figure 4:
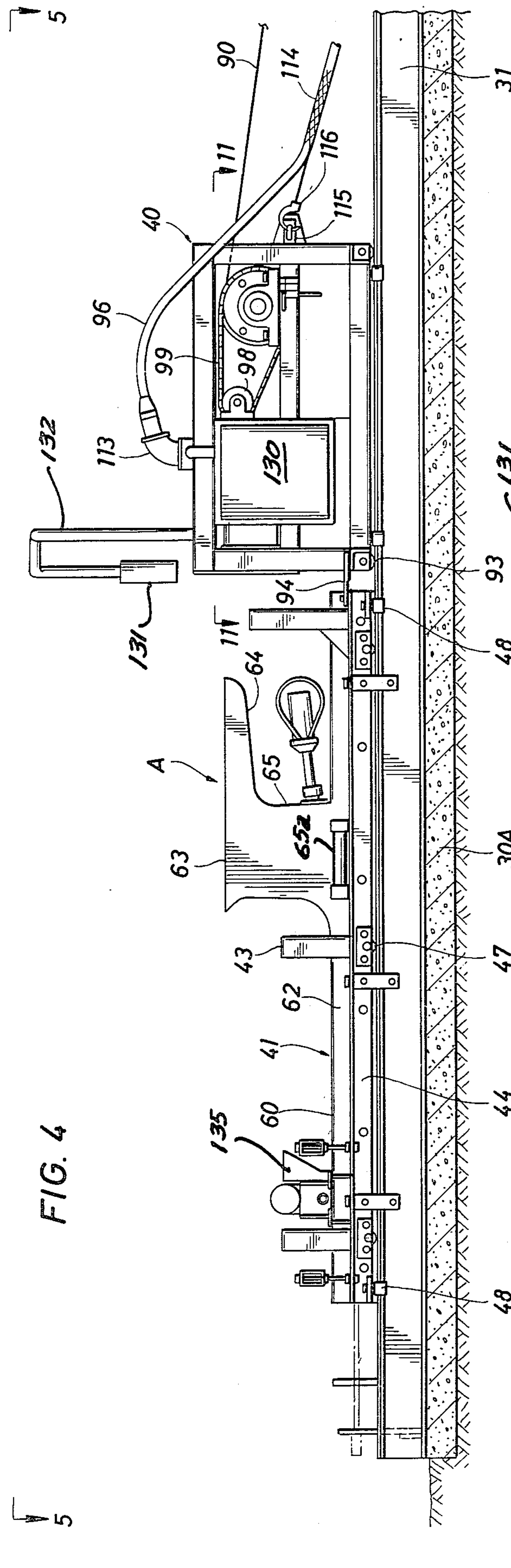
FIG. 4 is an enlarged side view of the apparatus shown in perspective in FIG. 1.
Figure 7:
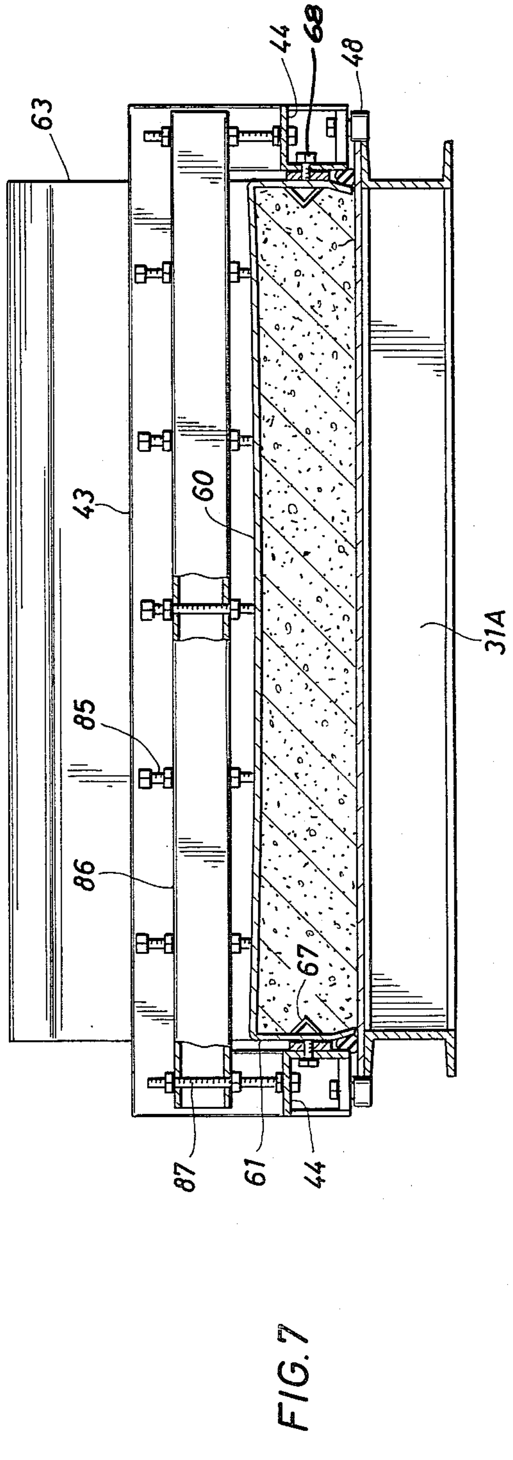
FIG. 7 is a cross-sectional view of the apparatus, as seen along broken lines 7—7 of FIG. 6.

A first set of rollers 47 are supported by the side members 44 of the frame beneath plate 46 and outboard of side plate 45 so as to engage the top side of each upper rail 36 of a pallet. As will be described to follow, the rollers 47 are mounted from the frame insuch a manner as to permit them to be adjusted vertically with respect thereto, and thus to adjust the lower edges of the side walls of the forming chamber of the forming body carried by the frame with respect to the top surface of pallet 34. A second set of rollers 48 are supported by the frame 44 for engaging the outer edges of the upper rails 36, as shown in FIG. 7, and thus guiding the frame for movement longitudinally with respect to the pallet. As best shown in FIG. 4, there are a pair of rollers 48 on each side of the frame, each preferably located toward one end thereof.

A third set of rollers 49 is mounted on each side of the frame for engaging the lower side of the top rail 46, and thus maintaining the rollers 47 tightly engaged with toe tip side of the rail despite the upward force exerted on the forming chamber due to concrete within the forming chamber. As will be described to follow, the rollers 49 are adjustable vertically with respect thereto so as to permit them to be moved into engagement with the lower side of the rail after the frame and forming body supported thereby are vertically adjusted with respect to the top surface of the pallet.

Figure 8:
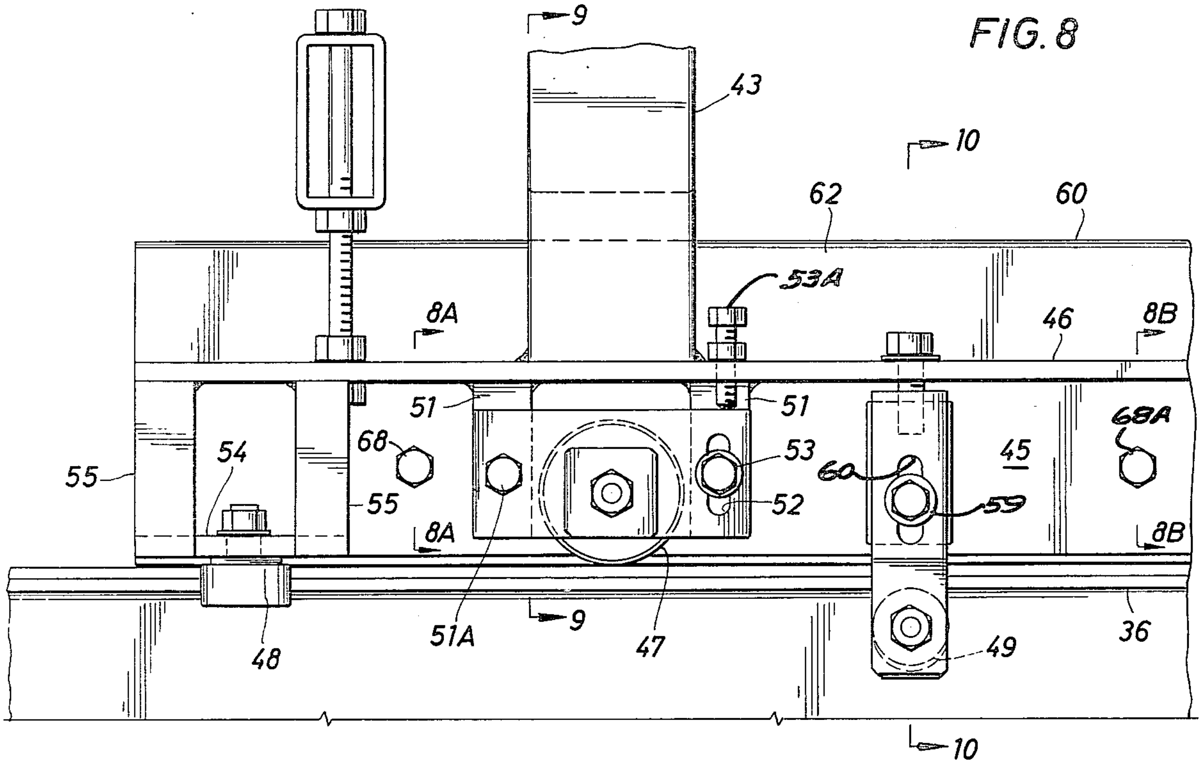
FIG. 8 is a side view of a portion of the forming chamber and frame of FIG. 4.
Figure 9:
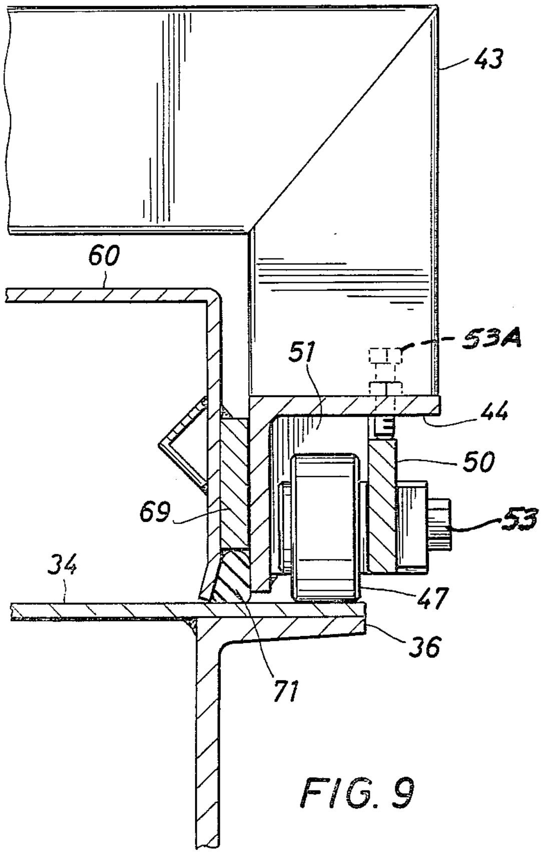
FIG. 9 is a cross-sectional view of a portion of the apparatus shown in FIG. 8, as seen along broken lines 9—9 thereof.

A shown in FIGS. 8 and 9, each roller 47 is rotatably supported by a plat 50 supported at each end from spaced-apart arms 51 connected to side member 44 on opposite sides of the roller by welding to each of the side and top plates 45 and 46 thereof. More particularly, one end of plate 50 is supported from the lefthand arm 51 by means of a bolt 51A, as shown in FIG. 8, which, when loosened permits the plate to be swung about its axis, and thus to raise or lower the roller 47. The opposite end of plate 50 is supported from the righthand arm 51 by means of another bolt 53 which extends through a substantially vertical slot 52 in the plate, so that when bolt 53 is loosened, the right end of the plate may be raised or lowered to adjust the elevation of the roller 47, after which the bolt may be tightened to fix it in adjusted position. More particularly, downward adjustment is made by means of a bolt 53A which is threadedly received in plate 46 to enable its lower end to be forced against the top of plate 50.

As shown in FIG. 8, a pin rotatably supporting each roller 48 is carried by a horizontal plate 54, which is suspended at level opposite the lower edge of side plate 45 by means of plates 55 extending from the side plate and connected at their upper ends to the outer side edge of top plate 46. The pin passes through a lateral slot (not shown) in the plate to permit roller 48 to be adjusted toward or away from the rail edge when the nut on the upper end of the pin is backed off.

Figure 10:
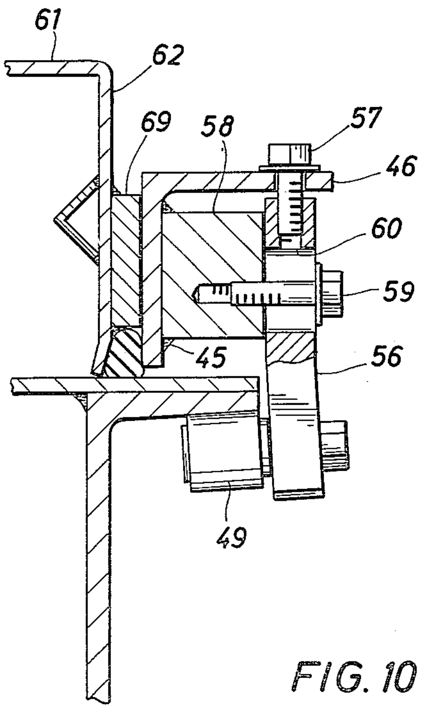
FIG. 10 is a cross-sectional view of another portion of the apparatus shown in FIG. 8, as seen along broken lines 10—10 thereof.

As shown in FIGS. 8 and 10, a pin rotatably supporting each roller 49 is carried on the lower end of a vertical bar 56 suspended from top plate 46 of the side member by means of a screw 57 extending through a hole in the top plate and having threads received in a tapped hole in the upper end of the bar. The bar is held tightly against a block 58 which is welded to side plate 45 of the side member by means of a bolt 59 so as to firmly locate the lower end of the bar 56 in position to hold roller 49 in tight engagement with the lower side of the top rail 36. The bolt passes through a vertical slot 60 in the bore so that, when backed off, it permits the bar to be raised or lowered by bolt 57. As shown in FIG. 10, the lower end of bar 56 is flared outwardly to a small degree so as to facilitate tight engagement of the cylindrical surface of roller 59 with the slightly tapered lower side of flange 36.

With carriage 41 in position the pallet, and the rollers 48 adjusted laterally to positions for guiding the frame 42 for movement longitudinally of the pallet, rollers 47 are adjusted in the manner above described so as to fix the elevation of the frame with respect to the pallet. As previously described, and as will be understood from the description to follow of the forming chamber, this also predetermines the elevation of the forming chamber with respect to the pallet. It will further be understood that this adjustment of the frame vertically with respect to the pallet is made possible by the relatively light weight of the overall apparatus. In any event, when the rollers 47 have been so adjusted, rollers 49 may then be adjusted to bring them into tight engagement with the lower side of the top rail 36, and then fixed in this position.

The forming body 60 of the frame comprises a top wall 61 and side walls 62 which depend from the top wall to provide the forming body with a cross section of inverted "U" shape. The forming body also includes a hopper 63 which is mounted on its top wall 61 intermediate its opposite ends, and the front end of the rearward extension of the top and side walls which define the opening into a forming chamber through which concrete passes as the chamber slips thereover.

Figure 6:
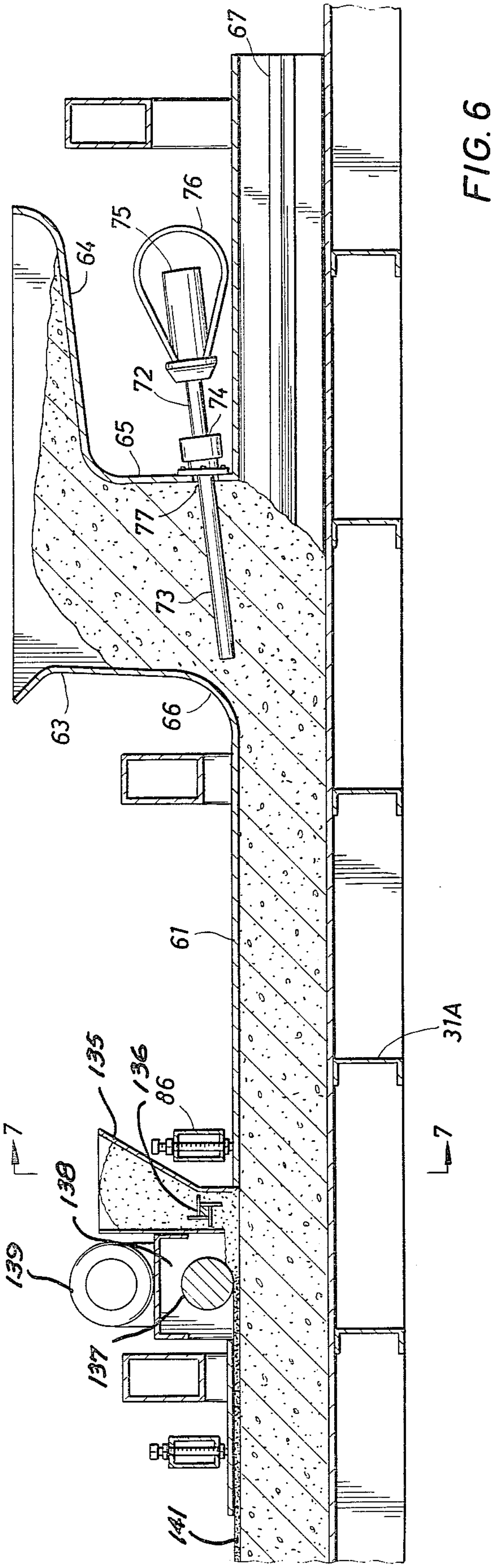
FIG. 6 is a further enlarged longitudinal sectional view of the forming body and supporting frame therefor, as seen along broken lines 6—6 of FIG. 5.

The hopper has an enlarged upper end 64 into which low slump concrete may be fed from a transmit mix truck or the like to one side of the pallet, and a vertical chute 65 connecting the enlarged upper end 64 with the front end of the forming chamber. As best shown in FIG. 7, the side walls of the hopper, including those of chute 65, are upward extensions of the side walls 62 of the forming body, and, as best shown in FIG. 6, the front and rear wall of the chute 65 flare forwardly and rearwardly, respectively, from the upper enlarged end of the hopper. More particularly, the lower end of the rear wall includes a portion 66 which curves downwardly and rearwardly to intersection with the front edge of the upper wall of the forming chamber. As previously described, this downwardly diverging cross-sectional shape of the chute, together with the curved wall portion 66, have been found to be especially useful in preventing bridging of the concrete within the hopper and maintaining a smooth flow of conrete from the hopper into the front end of the forming chamber.

A "V" shaped rib 67 extends along each side wall of the forming body so as to provide a groove with each side of the formed concrete member. As well known in the art, this groove is useful in providing a means by which tongs may engage the member to lift it from the pallet, or to otherwise transport it from one place to another.

The forming body, and thus the forming chamber and hopper, are fixedly connected to the frame by means of bolts 68, which, as shown in FIG. 8A, extend through the side plate 45 of each side member for threaded engagement with tapped holes in plate 69 which is welded along the outer side of the side wall of the forming body. The plate not only provides a firm anchor for bolts 68, but also reinforces the side walls of the forming body against outward bending due to lateral force of concrete being formed in the forming chamber. More particularly, and as shown in FIG. 8B, additional bolts 68A extend through tapped holes in side plate 45 so that their inner engage the outer faces of plate 69 to permit further tightening of the connection provided by bolts 68.

When the forming body is so connected to the frame, the lower edges of the side wall of the forming chamber are somewhat lower than the lower edges of the side plate 45. More particularly, rollers 47 are so adjusted vertically with respect to the frame to locate the lower edge of the side wall of the forming chamber as close as possible to the top surface of pallet 34.

The lower edge of reinforcing plate 69 is spaced above the lower edges of the side wall of the forming chamber and side plate 45 to provide a downwardly facing longitudinal recess. A strip 71 of deformable sealing material is wedged into the recess and is of such size that its lower end protrudes therefrom to form a sliding seal with the top surface of the pallet 34 as the apparatus is moved longitudinally thereof.

As best shown in FIG. 6, vibrators 72 are mounted on the front wall of hopper 63 in position to vibrate the concrete within the lower end of the chamber, and thus fluidize it as it enters the front end of the forming chamber. Each vibrator may be of conventional construction having a vibrating rod 73 at one end which is electrically actuated through a shaft 74 leading to an electrical motor 75 protected by means of a cage 76. The rod 73 is passed through a hole 77 in the front wall of the chute to extend into the concrete and is releasably held in this position by means of a quick release connection of the shaft of the vibrator to the front wall of the chute. Simple acting cylinders 65*a* or other suitable means are mounted on the forming body for tamping the opposite sides of the forming chamber to promote the free and steady release of concrete from dies 80. Simplified this is similar to walking with a hammer and tamping the frame or forming body in one direction to cause the concrete to release.

With reference to FIG. 16, this connection comprises a plate 78 having a tubular extension on one side to permit the plate to be disposed closely about the shaft and to be held against the outer side of the front wall of the chute. As shown, the plate is secured to the chute wall by means of bolts 79 received through circumferentially spaced-apart holes in the plate and threadedly connected to matching holes formed about the opening 77 in the wall. The tubular extension is enlarged to provide an annular recess which receives a seal ring 79A of deformable material, and a nut 79B is threadedly connected about the tubular extension and closely received about the shaft so as to permit the seal ring to be deformed into sealing engagement with the shaft as it is made up on the tubular extension. The motor 75 is connected by electrical lead lines (not shown) to individual electrical outlets (not shown) on the rear side of the carriage 40 which faces the vibrator.

In the event the cross-sectional shape of the concrete member to be formed is to be changed, the forming body is disconnected from the flame and replaced with a forming body having the desired cross-sectional shape. Although this requires that the operator maintain a supply of different forming bodies, the replacement of one such body for another is no more time-consuming than would be the adjustment of the parts of the forming body of the prior apparatus. Furthermore, removal of the forming body permits it to be washed off and cleaned, as is required periodically. Still further, the quickly releasable connection of the vibrators to the hopper permit them to be removed from and installed on the forming body with a minimum of delay.

The embodiment of the forming body illustrated in FIGS. 14 and 15 is identical to that above described, except for the addition of dies 80 carried within and preferably extending the length of the forming body as to form a hollow core member. As shown, there are a laterally spaced-apart series of dies each having its forward end suspended from rods 82 connected to the top wall of the forming body forwardly of the hopper by means of supporting frames 81. These frames may comprise plates which extend across the interior of the forming body, the rear plate being adjacent the front end of the forming chamber to prevent concrete from flowing in a forward direction. Preferably, the vibrating rods of the vibrators are laterally staggered with respect to the dies so as to further promote the flow of concrete downwardly between the upper ends of adjacent dies.

In accordance with another novel aspect of the present invention, the upper end of each die is comprised of intersecting walls 83 which are downwardly divergent from an apex 84. As previously described, this is believed to contribute further to a more uniform flow of concrete between the dies. The side walls of the dies extend vertically downwardly from the lower ends of the side walls, and the lower end thereof is a curved wall intersecting the side walls. The sides and upper and lower ends of the dies converge in a rearward direction-i.e., in a direction from the front toward the rear end of the forming body. As also previously described, this has been found useful in permitting a clean separation of the dies from the cores which they form in the concrete member.

As best shown in FIGS. 6 and 7, the top wall of the forming chamber of the forming body is forced downwardly from a flat to a concave configuration by means of rods 85 mounted on a beam 86 which is supported on the frame for extension laterally across the top side of the forming chamber. More particularly, each end of each beam is supported from the top plate 46 of side member 44 by means of a vertical support rod 87, which has nuts threaded about it above and below the top and lower sides of the ends of the beams, so as to permit the beams to be raised or lowered with respect to the forming chamber. Each rod 85 is threadedly connected to nuts engageable with the top and bottom sides of the span of the beam 86 so as to permit the rods to be raised and lowered with respect to the beam, and thus to permit their lower ends to move downwardly against the top wall of the forming chamber. As previously described, this preforming of the top wall of the forming chamber into a concave shape has been found useful in resisting the tendency of the top wall to bow upwardly or into a convex shape due to the upwardly directed force of the concrete member being formed therein.

As previously described, carriage 41 is hitched to the rear end of carriage 40, which is caused to move forwardly by means of a cable 90 wound upon a reel 91 on a shaft 91*a* carried by journals on the frame 92 of the carriage 40. The frame has rollers 93 mounted at the corners thereof for engagement with the top side of the rails on opposite sides of the pallet. The mounting of the rollers 93 may be of any suitable construction, and does not require vertical adjustment with respect to the frame of the carriage 40, as is required in the case of the supporting rollers of the carriage 41. Additional rollers 93*a* are mounted on the sides of frame 92 for engaging the outer edges of the rails, as shown in FIGS. 12 and 15, to guide the frame for movement along the rails and prevent lateral displacement of rollers 93. The frame of the carriage 41 is hitched to the frame of the carriage 40 by means of releasable latches 94 at each side of the frames.

The cable 90 is wound on reel 41 by means of an electric motor 95 mounted on frame 93 and adapted to be energized by a source of electrical energy adjacent the apparatus A through a power cord 96. As previously described, when concrete members are formed on side-by-side pallets, as in the system illustrated in FIG. 1, this power source may be located intermediate the pallets. Thus, as also previously described, in preparation for forming a concrete member on a pallet, the apparatus A is located at one end of the pallet, and the cable 90 is unwound from the reel to permit its attachment to the opposite end of the pallet. Then, as the reel is rotated by motor 95 to take up the cable 90, the apparatus is pulled to the opposite end of the pallet as concrete is fed through the hopper into the forming chamber of the carriage 41.

Motor 95 has its output shaft connected to a gear box 95A, which is of conventional construction having right angle gearing for transmitting rotation of the motor output shaft to driven shafts 97 and 98 extending laterally from each side of the gear box. Driven shaft 97 has a sprocket which drives a chain 99 disposed about a sprocket 100 connected to the reel 91, so as to rotate the reel at a speed dependent upon that of the motor and the ratio of the gears and sprockets. More particularly, and as best shown in FIG. 11, sprocket 100 is releasably connected to the reel 91 by means of bolts 101 so as to provide a clutch between the motor and the reel. That is, with the bolts fastened to connect the sprocket to the reel, the clutch is engaged to drive the reel in response to motor 95. On the other hand, with bolts 101 removed, sprocket rotation is not transmitted to the reel 91, so that the reel is not turned to wind the cable 90 thereabout.

The other driven shaft 98 is connected to a wheel having a tire 102 thereabout by means of a shaft 103 which extends vertically downwardly along one side of the frame 92 from a gear box 104 connecting with the outer end of driven shaft 98 in order to transmit rotation from shaft 98. Universal couplings 105 and 106 are connected intermediate each of the shafts and the gear box 104 in order to transmit rotation to and from the gear box despite misalignment of the gears within the box 104 and the shaft.

Figure 3:
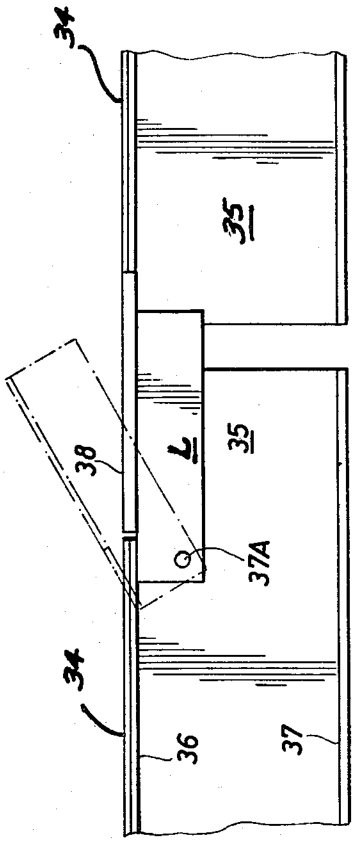
FIG. 3 is a side view of the latch, as seen along broken lines 3—3 of FIG. 2.

Thus, shaft 103 may be swung about a horizontal axis between the position of FIG. 12, wherein its tire is disengaged from the side of a rail along one side of the pallet, and the position of FIG. 3, wherein the tire is tightly engaged therewith so that rotation of the tire will cause the carriage 40 to move forwardly. The tire is shifted between these positions by means of a crank which includes a lever arm 107 pivotally mounted on a bracket 108 supported by a subframe 109 connected to the side of the frame 92, as shown in FIGS. 11 and 13. The inner end of the crank arm has an eccentric 110 thereon which engages the end of a rod 111 xtending laterally from shaft 103 through a hole in a cross piece 109A of the subframe 109. Rod 111 is urged outwardly away from the frame by means of a coil spring 112 acting between cross piece 109 and an enlarged head on the end of rod 111. Thus, with the lever arm 107 swung upwardly to the position of FIG. 12, eccentric 110 permits coil spring 112 to expand and thus move the tire 102 away from engagement with the side of the rail. On the other hand, downward swinging of the lever arm 107 to the position of FIG. 13 moves eccentric 110 into a position in which it urges the rod 111 inwardly against the force of spring 112 so as to move the tire 102 firmly agains the side of the rail.

As previously described, cord 96 supplies power from a suitable source to the electric motor 95. It also supplies electricity to a series of sockets (not shown) mounted on the rear side of the frame 92 of the carriage 40. These sockets correspond in number to the vibrators to permit electrical wiring from the motor for each vibrator to be connected to the sockets.

Figure 5:
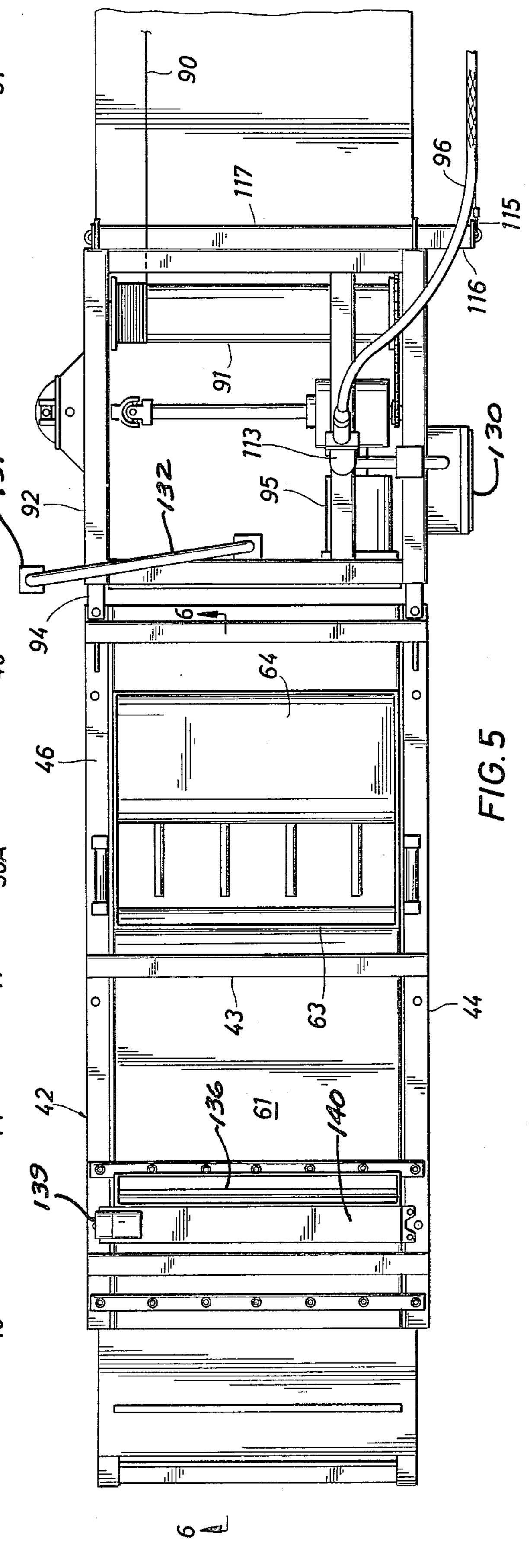
FIG. 5 is a top plan view of the apparatus of FIG. 4.

As shown in FIGS. 4 and 5, the cord 96 extends from a connector 113 mounted on the top of the frame 92, and an intermediate portion of the cord is supported by netting 114 connected to a hook 115 releasably connected to an eye 115A on the one end of a rod 116. The rod 116 is in turn supported within a guide 117 on the front side of the frame 92 for lateral shifting between a position in which one end of the rod 116 extends beyond one side of the frame, as shown in FIG. 5, and another position in which its opposite end extends beyond the other side of the frame. Thus, when the power source is on one side of the pallet over which the apparatus A is being moved, rod 116 may be shifted in that direction to dispose its outer end in position to support the intermediate portion of the power cable 96 out of the way of the just formed member. Then, in a system of the type illustrated in FIG. 1, wherein the apparatus A is moved over an adjacent side-by-side pallet to form a second concrete member, rod 116 may be shifted laterally to extend its other end beyond the other side of the frame so as to hold it above the second concrete member to be formed.

Power from motor 95 is selectively directed to different parts of the apparatus through a switch box 130 on the side of frame 92. The switches are manually actuated from a control panel 131 which is suspended from a wand 132 which is mounted on the frame in such a manner that it too may be swung from one side of the apparatus to the other.

Figure 17:
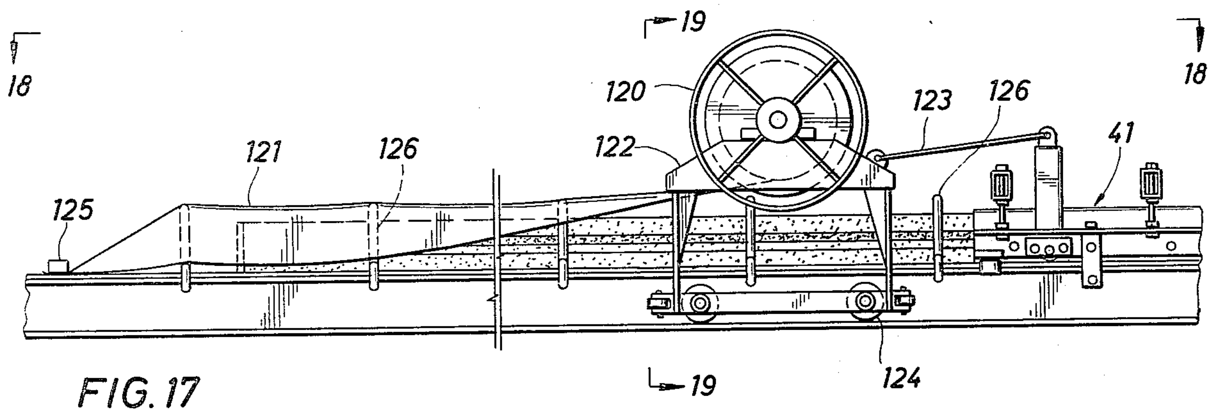
FIG. 17 is a side elevation view of a tarpaulin which is wound on a frame supported reel and has one end attached to one end of the pallet, so that it is automatically laid over a formed member as the reel is towed behind a frame on which the forming chamber is mounted, and showing rods fitted over the rails of the pallet to support the tarpaulin above the member.
Figure 18:
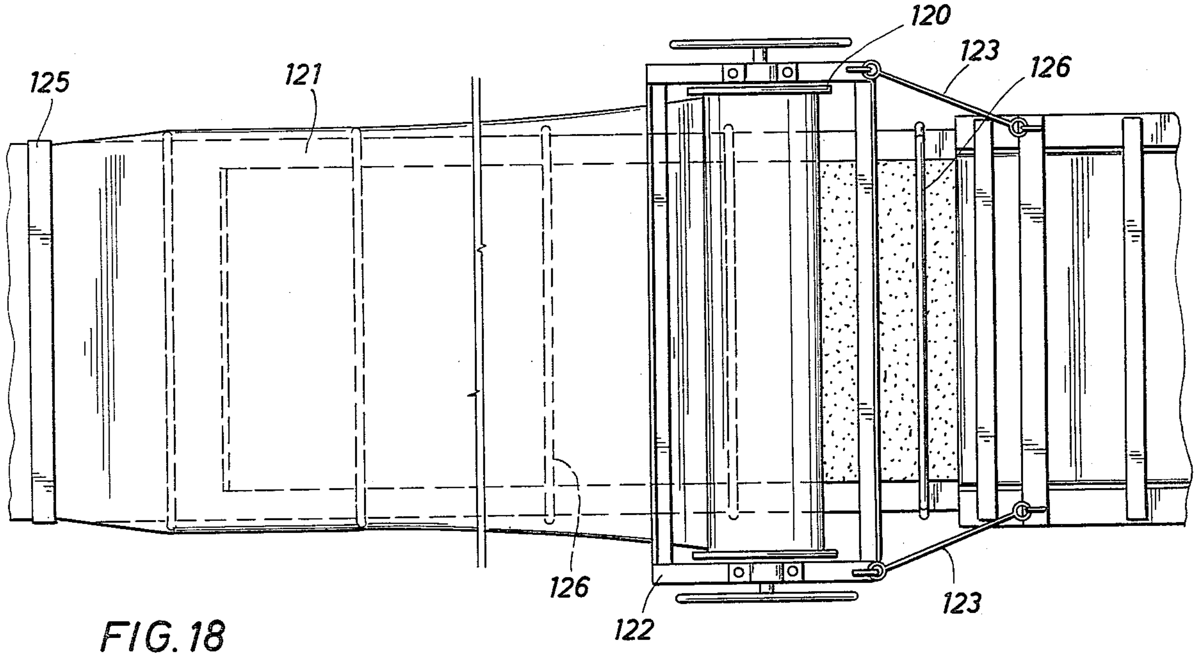
FIG. 18 is a top plan view of the apparatus of FIG. 17, as seen along broken lines 18—18 of FIG. 17.
Figure 19:
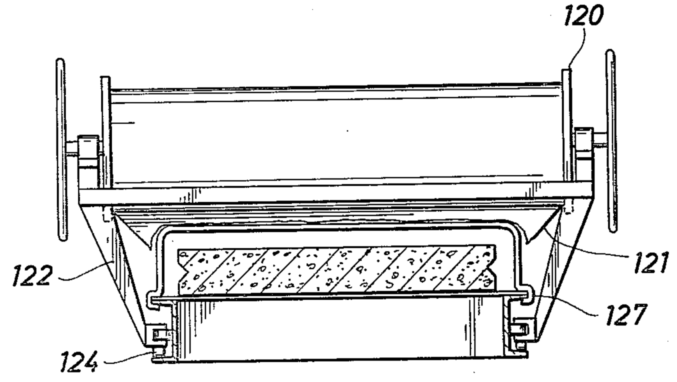
FIG. 19 is a cross-sectional view of such apparatus, as seen along broken lines 19—19 of FIG. 17.

As shown in FIGS. 17 to 19, reel 120 for tarpaulin 121 is mounted on a frame 122 which is towed behind the carriage 41 by means of a bridle 123. The frame 122 is guidably movable over the pallet by means of rollers 124 engageable with the lower rail 37 of each side member of each pallet. More particularly, the frame has depending legs on each side to mount rollers 124 in position to support the reel 20 above the formed concrete member emerging from the rear end of the forming chamber of the carriage 41. In use, and with the frame 122 hitched to carriage 41, the free end of the tarpaulin 121 is attached to the pallet, as at 125, so that it is automatically unwound therefrom as the pallet moves forwardly with the remainder of the apparatus, thereby providing a cover for the formed concrete member to protect it from the weather as it sets up.

Rods 126 are mounted on the pallet over the formed concrete member, as it emerges from the forming body and before it passes beneath reel 120, so as to hold the tarpaulin off the formed member as it comes off the reel. The operator is able to systemmatically mount the rods on the pallet intermediate the rear end of carriage 41 and the front end of the frame for the reel 20, as the concrete member is being formed, by merely snapping the grooved lower ends of the rods over the edges of the top rails. Thus, the inverted "U" shaped rod is flexible to permit its grooved ends to be swung outwardly to pass over the edges of the rails and then released to tightly grip the edges.

The means for applying facing material, such as fine aggregate, to the top side of the concrete member being formed is illustrated in FIGS. 4, 5 and 6 to comprise a hopper 135 leading to an opening in the top wall of the forming chamber rearwardly of the hopper 63. More particularly, the hopper 135, similarly to hopper 63, extends from one side to the other of forming chamber and has a front wall which connects with the edge of the top wall of the forming chamber at the forward end of the opening in to the chamber. The lower end of the rear wall of the chute is raised somewhat above the top surface of the concrete member being formed so as to permit the facing material to flow beneath it. The flow of facing material onto the concrete member is regulated by means of a paddle assembly 136 mounted for rotation about a transverse axis within the lower end of the chute.

The facing material which passes beneath the lower edge of the rear wall is smoothed and compressed against the top side of the concrete member being formed by means of a roller 137 disposed rearwardly of the chute and rotatably mounted at opposite ends by upstanding walls 138 on the forming body. A motor 139 is in turn mounted on top wall 140 extending between the side walls 138, and each of the roller 137 and auger 136 may be rotated in a suitable manner by means of a motor 139. As shown in FIG. 6, the portion of top wall 61 of the forming chamber rearwardly of the chute 135 is raised somewhat so as to accommodate the compressed layer 141 of facing material.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in slip forming a structural concrete member on the top surface of an elongate pallet which has rails extending along its sides, said apparatus comprising a frame having rollers engageable with the rails to support the frame on the pallet for movement forwardly along the pallet, a forming body on the frame having a forming chamber comprising a topwall spaced above the pallet, side walls depending from the top wall to dispose their lower edges close to the top surface of the pallet, and an open rear end through which concrete may pass as the frame is so moved, and a hopper through which concrete may be fed to the front end of the forming chamber, and means for adjusting the elevation of the rollers with respect to the frame so as to raise and lower the lower edges of the side walls of the chamber.

2. Apparatus for use in slip forming a structural concrete member on the top surface of an elongate pallet which has rails extending along its sides, said apparatus comprising a frame, a first set of rollers carried by the frame for engaging the top sides of the rails to support the frame for movement forwardly along the pallet, a second set of rollers carried by the frame for engaging the bottom sides of the rails to hold the first set of rollers down upon the rails, a forming body on the frame having a forming chamber comprising a top wall spaced above the pallet, side walls depending from the top wall to dispose their lower edges close to the top surface of the pallet, and an open rear end through which concrete may pass as the frame is so moved, and a hopper through which concrete may be fed to the front end of the forming chamber, and means for adjusting the elevation of the rollers of each set with respect to the frame so as to raise and lower the lower edges of the side walls of the chamber.

3. Apparatus for use in slip forming a structural concrete member on the top surface of an elongate pallet which has rails extending along its sides, said apparatus comprising, a frame having rollers engageable with the rails to support the frame for movement forwardly along the pallet, a forming body on the frame having a forming chamber comprising a top wall spaced above the pallet, side walls depending from the top wall to dispose their lower edges close to the top surface of the pallet, and an open rear end through which concrete may pass as the frame is so moved, and a hopper through which concrete may be fed to the front end of the forming chamber, said hopper having a vertical chute where side walls form an upward continuation of the side walls of the forming chamber, and whose front and rear walls extend laterally between the side walls and flare forwardly and rearwardly, respectively, from the end of the hopper, the lower end of the rear wall of the chute curving downwardly and rearwardly to its intersection with the front edge of the upper wall of the forming chamber.

4. Apparatus for use in slip forming a structural concrete member on the top surface of an elongate pallet which has rails extending along its sides, said apparatus comprising a frame comprising longitudinally extending side members having depending side plates whose lower edges extend downwardly to positions close to the top surface of the pallet, rollers mounted on the side members outboard of the side plates for engaging the rails to support the frame for movement forwardly along the pallet, a forming body having a forming chamber comprising open front and rear ends and depending side walls, a hopper on the forming body having a lower end which leads to the front end of the forming chamber, and means connecting the side walls of the forming chamber to the inner sides of the side plates of the frame to support the lower edges of said side walls close to the top surface of the pallet.

5. Apparatus of the character defined in claim 4, wherein said first-mentioned rollers engage the top sides of the rails, and additional rollers are mounted on the side members outwardly of the side plates of the forming chamber for engaging the lower sides of the rails so as to hold the first-mentioned rollers down upon the rails as the frame is so moved.

6. Apparatus of the character defined in claim 5, including still further rollers mounted on the side members outwardly of the side plates for movement over the outer sides of the rails.

7. Apparatus of the character defined in claim 4, wherein said connecting means includes a plate extending longitudinally between the outer side of each side wall of the forming chamber and the side plates of the frame, the lower end of said plate being spaced above the lower edges of the side wall of the forming chamber and the side plate of the frame to form a downwardly opening longitudinal recess, and a strip of deformable sealing material is wedged into the recess and protrudes from the lower open end thereof to form a sliding seal with the top surface of the pallet.

8. Apparatus of the character defined in claim 4, wherein the side walls of the forming chamber are fixedly connected to the side plates of the frame, and the first and second rollers are mounted on the side members for vertical adjustment with respect thereto.

9. Apparatus of the character defined in claim 4, wherein said connecting moves include a plate secured to the outer side of each side wall of the forming chamber for extension longitudinally thereof, and bolts extending through the side plates and threaded into the longitudinally extending plate to connect forming chamber to the frame.

10. Apparatus of the character defined in claim 9, including additional bolts threadedly received in the side plates and having inner ends which bear against the outer side of the longitudinal extending plate.

11. Apparatus for use in slip forming a structural concrete member on the top surface of an elongate pallet which has rails extending along its sides, said apparatus comprising first and second carriages each comprising a frame having rollers thereon engageable with the rails to support the carriage for movement forwardly along the pallet, a reel on the first carriage having a cable whose free end is attachable to one end of the pallet to permit the first carriage to be pulled toward said one end of the pallet as the cable is wound on the reel, motor means on the first carriage for turning the reel, said second carriage being attachable to the first carriage so the frame of the second carriage may be pulled along the pallet behind the first carriage, a forming body on the frame of the second carriage comprising a forming chamber comprising a top wall spaced above the pallet, side walls depending from the top wall to dispose their lower edges close to the top surface of the pallet, and an open rear end through which concrete may pass as the frame is so moved, and a hopper through which concrete may be fed to the front end of the forming chamber.

12. Apparatus of the character defined in claim 11, wherein the forming body of the second carriage is fixedly mounted on the frame thereof, and means are provided for adjusting the rollers of the frame of the second carriage vertically with respect to the forming body thereof.

13. Apparatus for use in slip forming a structural concrete member on the top surface of an elongate pallet which has rails extending along its sides, said apparatus comprising a frame having rollers thereon engageable with the rails to support the frame for movement forwardly along the pallet, a reel on the frame having a cable whose free end is attachable to one end of the pallet to permit the frame to be pulled toward said one end of the pallet as the cable is wound on the reel, a wheel having a tire thereon and mounted on the frame for movement into and out of tight engagement with the outer side of one rail, motor means on the frame, means for connecting said motor means to each of the reel and wheels for turning same, and a clutch between the connecting means and reel to permit the wheels to be turned without turning the reel.

14. Apparatus of the character defined in claim 13, wherein the motor means comprises an electrical motor mounted on the frame with its output shaft disposed longitudinally thereof, a gear box having driven shafts extending laterally from each side thereof and connected to the output shaft of the motor driving both driven shafts, the outer end of one driven shaft being connected to the wheel and the outer end of the other driven shaft being connected to the clutch.

15. In a system comprising a pair of longitudinally extending, laterally spaced-apart pallets each having rails extending along opposite sides thereof, each pallet having a longitudinally intermediate section, said pair of pallets including a pair of end sections each adapted to be moved between alignment with one end of the intermediate section of one or the other pallet, and means for releasably connecting each end section to the end of an intermediate section when aligned therewith; apparatus for use in slip forming structure structural concrete members on the pallets, comprising frame means having rollers mounted thereon for engagement with the rails of the pallets to support the frame means for movement therealong, a forming body on the frame means having a forming chamber comprising a top wall spaced above the pallet, side walls depending from the top wall to dispose their lower edges close to the top surface of the pallet, and an open rear end through which concrete may pass as the frame is so moved, and a hopper through which concrete may be fed to the front end of the forming chamber, and a reel on the frame means having a cable whose free end is attachable to one end of a pallet to permit the frame means to be pulled toward said one end of the pallet as the cable is wound on the reel, a wheel having a tire thereon mounted on the frame means for tightly engaging with the outer side of one of the rails to move the pallet toward the other end of the pallet, and means including motor means for selectively winding the cable on the reel or driving the wheel against the rail.

16. Apparatus for use in slip forming a structural concrete member on the top surface of an elongate pallet which has rails extending along its sides, said apparatus comprising a frame having rollers engageable with the rails to support the frame for movement forwardly along the pallet, a forming body on the frame having a forming chamber comprising a top wall spaced above the pallet, side walls depending from the top wall to dispose their lower edges close to the top surface of the pallet, and an open rear end through which concrete may pass as the frame is so moved, and a hopper through which concrete may be fed to the front end of the forming chamber, said hopper having a front wall with laterally spaced holes therein, a plurality of vibrators each having a vibrating rod on one end which may be passed through a hole in the hopper and a shaft for connecting the rod to an energy source, and means for releasably mounting each vibrator on the hopper with the rod thereof in the front end of the forming chamber, each said mounting means comprising a plate having a tubular extension on its rear side to closely receive a vibrator shaft, and an outwardly enlarged annual recess in the extension, a seal ring of deformable material in the recess, and a nut close about the vibrator shaft and threadedly engageable with the outer diameter of the tubular extension so that it may be moved into a position to deform the seal reing into sealing engagement with the vibrator shaft.

17. Apparatus for the character defined in claim 16, wherein the forming body and frame are fixedly connected to one another, and means are provided for vertically adjusting the rollers with respect to the frame.

18. Apparatus for use in slip forming a structural concrete member on the top surface of an elongate pallet which has rails extending along its sides, said apparatus comprising a frame having rollers engageable with the rails to support the frame on the pallet for movement forwardly along the pallet, a forming body on the frame having a forming chamber comprising a top wall spaced above the pallet, side walls depending from the top wall to dispose their lower edges close to the top surface of the pallet, and an open rear end through which concrete may pass as the frame is so moved, and a hopper through which concrete may be fed to the front end of the forming chamber, beams mounted on the frame and extending laterally across the forming chamber above the top wall thereof, and rods carried on the beams for vertical movement with respect thereto so as to force their lower ends against the top wall of the forming chamber.

19. Apparatus for use in slip forming a structural concrete member on the top surface of an elongate pallet which has rails extending along its sides, said apparatus comprising a frame having rollers engageable with the rails to support the frame on the pallet for movement forwardly along the pallet, a forming body on the frame having a forming chamber comprising a top wall spaced above the pallet, side walls depending from the top walll to dispose their lower edges close to the top surface of the pallet, and an open rear end through which concrete may pass as the frame is so moved, and a hopper through which concrete may be fed to the front end of the forming chamber, a plurality of dies supported by the forming body forwardly of the lower end of the hopper and extending into the forming chamber, each die comprising an elongate body whose upper ends are forced by intersecting flat walls which diverge downwardly, and whose upper and lower ends and sides converge in a rearward direction.

20. Apparatus for use in slip forming a structural concrete member on the top surface of an elongate pallet which has rails extending along its sides, said apparatus comprising a carriage comprising a frame having rollers engageable with the rails to support the frame on the pallet for movement forwardly along the pallet, means on the frame by which it may be caused to move forwardly along the pallet, an electrical motor for supplying energy to the last-mentioned means, a cord connecting to the motor for supplying power thereto from a source near the pallet, a rod extending laterally across the frame for shifting laterally thereof between one position in which one end thereof extends beyond one side of the frame and another position in which the other end thereof extends laterally beyond the other side of the frame, and means for supporting an intermediate portion of the cord from the extended end of the rod.

21. Apparatus for use in slip forming a structural concrete member on the top surface of an elongate pallet which has rails having upper and lower flanges, comprising first and second carriages each comprising a frame having rollers thereon engageable with the rails to support the carriage for movement forward along the pallet, a forming body on the frame of the first carriage comprising a forming chamber comprising a top wall spaced above the pallet, side walls depending from the top wall to dispose their lower edges close to the top surface of the pallet, and an open rear end through which concrete may pass as the frame is so moved, and a hopper through which concrete may be fed to the front end of the forming chamber, and said second carriage being connectible to the first carriage to permit it to be moved forwardly therewith, a reel on the frame of the second carriage having a tarpaulin wound thereabout and adapted to be unwound when the free end thereof is attached to one end of the pallet and the carriages are moved toward the other end thereof, whereby the tarpaulin is caused to lay down over the formed member, and flexible inverted "U" shaped rods having grooves in their free ends for fitting over the edges of the rails, the sides of the rods being high enough to permit the formed member to pass therebeneath, and the frame of the second carriage having a passage there through to pass over the rods when so fitted over the rails.

22. Apparatus for use in slip forming a structural concrete member on the top surface of an elongate pallet which has rails extending along its sides, said apparatus comprising a frame having rollers engageable with the rails to support the frame on the pallet for movement forwardly along the pallet, a forming body on the frame having a forming chamber comprising a top wall spaced above the pallet, side walls depending from the top wall to dispose their lower edges close to the top surface of the pallet, and an open rear end through which concrete may pass as the frame is so moved, a first hopper through which concrete may be fed to the front end of the forming chamber, a second hopper through which a facing material may be fed to the forming chamber intermediate its front and rear ends in order to apply said material to the top surface of the concrete members to be formed, the portion of the top wall of the chamber rearward of the second hopper being higher than that forward of said second hopper to allow for passage of a layer of said facing material on the top surface of the concrete member.

23. Apparatus of the character defined in claim 22, including a roller for smoothing and compressing the facing material against the topside of said member to form said layer.

24. Apparatus of the character defined in claim 22, including a paddle assembly mounted for rotation about a transverse axis within the lower end of the hopper regulating the flow of facing material onto the top surface of the concrete member.

* * * * *